(12) United States Patent
Nagami

(10) Patent No.: US 7,244,490 B2
(45) Date of Patent: Jul. 17, 2007

(54) ANTI-NEWTON RING SHEET

(75) Inventor: Hideharu Nagami, Mie-ken (JP)

(73) Assignee: Kimoto Co., Ltd. (JP)

( * ) Notice: Subject to any disclaimer, the term of this patent is extended or adjusted under 35 U.S.C. 154(b) by 0 days.

(21) Appl. No.: 10/392,892

(22) Filed: Mar. 21, 2003

(65) Prior Publication Data

US 2003/0180529 A1    Sep. 25, 2003

(30) Foreign Application Priority Data

Mar. 25, 2002    (JP) .............................. 2002-082483

(51) Int. Cl.
*B32B 27/32*    (2006.01)
*B32B 5/16*    (2006.01)

(52) U.S. Cl. ....................... 428/323; 428/220; 428/332

(58) Field of Classification Search ................ 428/323, 428/327, 331, 332, 500, 515, 220
See application file for complete search history.

(56) References Cited

U.S. PATENT DOCUMENTS 6,592,950 B1 *    7/2003    Toshima et al. ............. 428/1.1

* cited by examiner

*Primary Examiner*—Sheeba Ahmed
(74) *Attorney, Agent, or Firm*—Bacon & Thomas, PLLC

(57) ABSTRACT

An anti-Newton ring sheet includes an anti-Newton ring layer containing binder resin and particles, and formed on at least one surface of a transparent polymer film, wherein the particles are monodisperse spherical particles having a mean particle diameter of not less than 0.4 μm and not more than 2.0 μm and are contained in an amount of not less than 0.5 parts by weight and not more than 3 parts by weight based on 100 parts by weight of the binder resin. The anti-Newton ring sheet can prevent scratching of a contact surface even if it is brought into contact with a light guide plate or the like made of a softer material, without loss of the anti-Newton ring effect. The anti-Newton ring sheet can be utilized for an optical film having an anti-Newton ring effect by providing an optical function layer such as a light diffusing layer on the surface opposite the anti-Newton ring layer.

20 Claims, 1 Drawing Sheet

ANTI-NEWTON RING SHEET

CROSS-REFERENCE TO RELATED APPLICATIONS

This application claims, under 35 USC 119, priority of Japanese Application No. 2002-82483 filed Mar. 25, 2002.

BACKGROUND OF THE INVENTION

The present invention relates to an anti-Newton ring sheet. In particular, it relates to an anti-Newton ring sheet which can be used for optical sheets such as a light diffusing sheet suitable for a backlight unit of a liquid crystal display.

RELATED ART

In liquid crystal displays, which have made rapid advances in recent years, in order to improve the front luminance of the display and obtain a wide angle view, a light diffusing sheet is used in the backlight unit disposed on the backside of a liquid crystal display unit to improve luminance of displayed images.

Such a light diffusing sheet is required to be capable of imparting a wide angle view to light emitted from a light guide plate such as an edge light and of improving luminance in the front direction, and is generally a structure in which a light diffusing layer or an anti-Newton ring layer is provided on a substrate.

Among light guide plates for edge lights, one having a wedge shape is mainly used and many of them are made of a soft resin in the interest of good workability. Therefore, there is a need for light diffusing sheets having an anti-Newton ring layer which does not scratch the surface of the light guide plate made of such a soft resin when placed thereon.

However, since the anti-Newton ring layer is designed to prevent occurrence of Newton rings by keeping the light diffusing sheet from adhering to the light guide plate, and consists of a binder resin and particles forming fine protrusions dotted on its surface, it is apt to scratch a soft material having a surface softer than the surface of the anti-Newton ring layer when it is brought into contact with the material. If the light guide plate is scratched, the scratch site becomes a luminous point.

Accordingly, an object of the present invention is to provide an anti-Newton ring sheet having an anti-Newton ring layer capable of preventing scratches on the surface of a light guide plate or the like made of a softer material when the layer is brought into contact with the surface, without degrading the anti-Newton ring effect.

SUMMARY OF THE INVENTION

It has now been found that the above-mentioned problems can be solved by using a particular type of particles in the anti-Newton ring layer.

Specifically, the anti-Newton ring sheet of the present invention comprises an anti-Newton ring layer formed on at least one surface of a transparent polymer film, which anti-Newton ring layer comprises at least a binder resin and particles that are monodisperse spherical particles having a mean particle diameter of not less than 0.4 µm and not more than 2.0 µm and are included in an amount of not less than 0.5 parts by weight and not more than 3 parts by weight based on 100 parts by weight of the binder resin.

DESCRIPTION OF THE PREFERRED EMBODIMENTS

Preferred embodiments of the anti-Newton ring sheet of the present invention will be explained in detail hereinafter.

Figure 1:
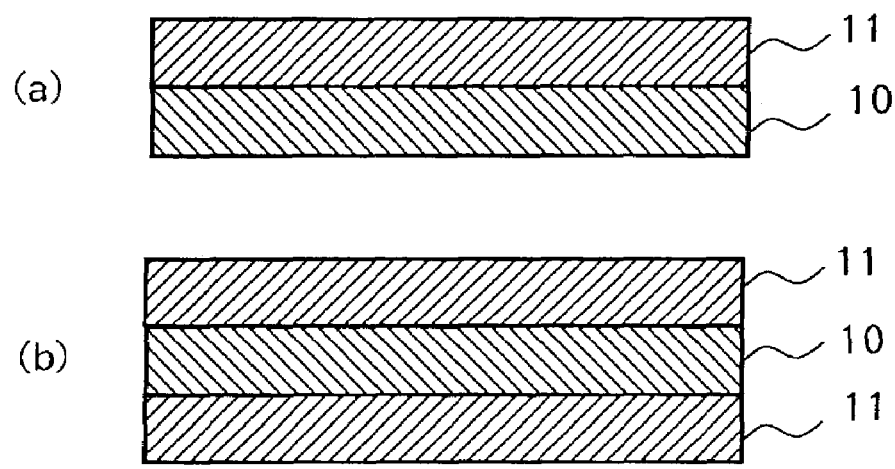
FIGS. 1(a) and 1(b) show anti-Newton ring sheets that are embodiments of the present invention.
Figure 2:
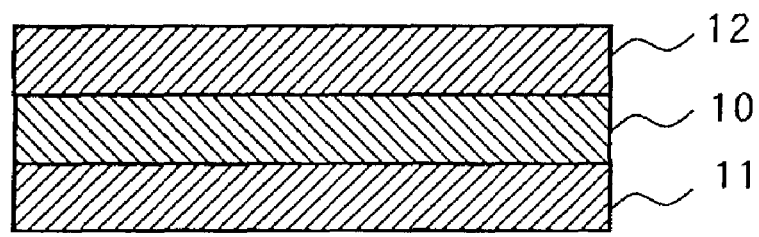
FIG. 2 shows an optical film having an anti-Newton ring effect in accordance with the present invention.

As shown in FIGS. 1(a) and 1(b), the anti-Newton ring sheet of the present invention is provided with an anti-Newton ring layer 11 on at least one surface of a transparent polymer film 10. The sheet is incorporated into a backlight unit and functions as a sheet for preventing occurrence of Newton rings between films constituting the backlight. As shown in FIG. 2, the anti-Newton ring sheet of the present invention can be used as an optical sheet such as a light diffusing sheet by providing a layer 12 having an optical function such as light diffusion on another surface of the transparent film 10.

Components of the anti-Newton ring sheet of the present invention now will be explained.

As the transparent polymer film, any material that does not impair transparency can be used. Examples include polyethylene terephthalate, polybutylene terephthalate, polyethylene naphthalate, polycarbonates, polyethylenes, polypropylenes, polystyrenes, triacetyl cellulose, acrylic resins, and polyvinyl chloride. Among these, a polyethylene terephthalate film subjected to orienting, particularly biaxial orienting, is preferred in view of superiority in mechanical strength and dimensional stability. The thickness of such a transparent polymer film is suitably selected depending on the material, but is generally 25-500 µm, preferably 50-200 µm.

The anti-Newton ring layer, which is provided on at least one surface of the transparent polymer film, consists of at least a binder resin and particles and has an uneven surface. The anti-Newton ring layer of the present invention has a function of preventing occurrence of Newton rings between the anti-Newton ring sheet and a flat surface with which it is in contact, while also preventing scratching of the contact surface.

In order to impart these capabilities to the anti-Newton ring layer, monodisperse spherical particles having a mean particle diameter of not less than 0.41 µm, preferably not less than 0.8 µm and not more than 2.0 µm, preferably not more than 1.3 µm, are included in the layer in an amount of not less than 0.5 parts by weight and not more than 3 parts by weight based on 100 parts by weight of the binder resin.

Newton rings are generated by interference between light reflected from two flat surfaces touching each other and can be prevented by providing a gap between the two surfaces utilizing the uneven surface of the anti-Newton ring layer. However, the configuration of the uneven surface and the height of its protrusions are considered to be causes of formation of scratches on the contact surface. According to a study conducted by the inventors, when the mean particle diameter of particles included in the anti-Newton ring layer is less than 0.4 µm, sufficient anti-Newton ring effect cannot be obtained, and when the mean particle diameter of particles is more than 2.0 µm, sufficient anti-scratch effect cannot be obtained. When the mean particle diameter of the particles is 1.3 μm or less, an excellent anti-scratch effect can be obtained. Further, when the particles are not monodisperse spherical particles but multi-disperse irregular aggregated particles, the anti-scratch effect is diminished.

The monodisperse particles are defined as particles of approximately the same size in a dispersion, that is, particles having a narrow particle diameter distribution. As an index of narrowness of the particle diameter distribution, the coefficient of variation of the particle diameter distribution should not be more than 25%, preferably not more than 20%, more preferably not more than 15%, still more preferably not more than 10%. The shape of the particles is spherical, preferably true spheres. Suitable examples of such monodisperse spherical particles include inorganic particles such as spherical silica particles, synthetic resin particles such as spherical acrylic resin particles, spherical polystyrene resin particles, spherical polyurethane resin particles, spherical polyethylene resin particles, spherical benzoguanamine resin particles, and spherical epoxy resin particles.

The content of the monodisperse spherical particles is not less than 0.5 parts by weight and not more than 3 parts by weight based on 100 parts by weight of the binder resin, since sufficient anti-Newton ring effect cannot be obtained when the particles are added in an amount of less than 0.5 parts by weight and sufficient anti-scratch effect with respect to the contact surface cannot be obtained when added in an amount of more than 3 parts by weight based on 100 parts by weight of the binder resin.

The binder resin having optical transparency can be a thermoplastic resin, thermosetting resin, or ionizing radiation curable resin. Examples of such resins, acrylic resins, polyester resins, polyurethane acrylate resins, epoxy acrylate resins, cellulose resins, acetal resins, vinyl resins, polyethylene resins, polystyrene resins, polypropylene resins, polyamide resins, polyimide resins, melamine resins, phenol resins, silicone resins, fluorine resins. Among them, acrylic resins having good weathering resistance and high transparency, in particular two-part curable type acrylic polyurethanes, are preferable.

The anti-Newton ring layer as described above is produced by preparing a coating solution containing, in a binder resin, monodisperse spherical particles having a mean particle diameter of not less than 0.4 μm and not more than 2.0 μm, and in an amount of not less than 0.5 parts by weight and not less than 3 parts by weight based on 100 parts by weight of the binder resin and diluting as required, and applying the coating solution onto the surface of a transparent polymer film.

The thickness of the anti-Newton ring layer is not particularly limited in so far as it exhibits its intended function, but is in the range of 1-20 μm, preferably 3-10 μm.

The anti-Newton ring layer of the present invention may contain dispersing agents, anti-static agents, leveling agents and the like in addition to the aforementioned binder resin and monodisperse spherical particles so long as the function of the anti-Newton ring sheet is not compromised.

When the anti-Newton ring sheet of the present invention is used as an optical sheet such as a light diffusing sheet, an optical function layer such as a light diffusing layer is formed on the surface opposite the surface on which the anti-Newton ring layer is provided. The optical function layer may be a light diffusing layer, prism layer, anti-reflection layer, polarizing layer, reflection layer and so forth.

The optical function layer, for example a light diffusing layer, can be formed by preparing a coating solution containing a light diffusing agent in a binder resin such as a thermoplastic resin, thermosetting resin, or ionizing radiation resin and a diluting solvent as required, and applying the coating solution onto a surface of the transparent polymer film.

The type and content of the binder resin and light diffusing agent and the thickness of the light diffusing layer can be suitably selected.

Figure 3:
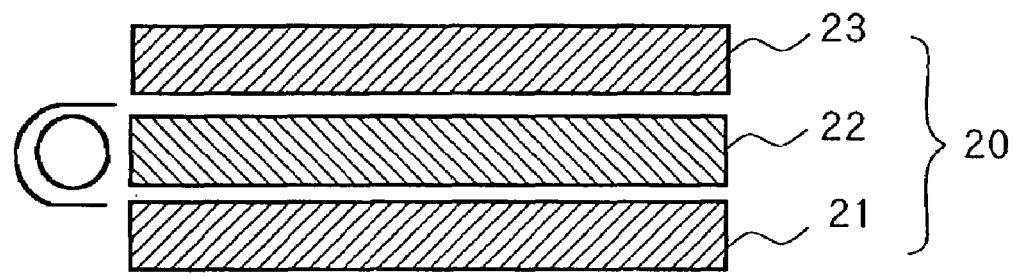
FIG. 3 shows a backlight unit in which the optical film having an anti-Newton effect, in accordance with the present invention, is incorporated.

As shown in FIG. 3, an optical film having an anti-Newton ring property, in accordance with the present invention can be incorporated as a light diffusing sheet into a backlight unit 20 constructed by laminating a light diffusing sheet 23, a light guide plate 22 and a reflection sheet 21 as shown in FIG. 3, and is capable of preventing occurrence of Newton rings, without scratching the contact surface, even if that contact surface is a light guide plate made of a relatively soft material.

EXAMPLES

In the following examples, "part" and "%" are used on a weight basis unless otherwise indicated.

Example 1

A coating solution for an anti-Newton ring layer having the following composition was applied to one surface of a transparent polyethylene terephthalate film (Lumirror T-60: Toray Industries Inc.) having a thickness of 100 μm, dried and cured by heat to form an anti-Newton ring layer having a thickness of about 5 μm. Thus, an anti-Newton ring sheet of the present invention was produced.

Next, a coating solution for a light diffusing layer having the following composition was applied to the surface of the anti-Newton ring sheet opposite the anti-Newton ring layer, dried and cured by heating to form a light diffusing layer having a thickness of about 12 μm. Thus, a light diffusing sheet was produced.

| <Coating solution for anti-Newton ring layer> | |
|---|---|
| Acrylic polyol<br>(Acrydic A-807, solid content 50%:<br>Dainippon Ink and Chemical, Inc.) | 162 parts |
| Isocyanate<br>(Takenate D110N, solid content 60%:<br>Mitsui Takeda Chemicals, Inc.) | 32 parts |
| Monodisperse spherical silica particles<br>(Seahostar KE-P100, mean particle diameter: 1.1 μm<br>Nippon Shokubai Co., Ltd.) | 1.5 parts |
| Butyl acetate | 200 parts |
| Methyl ethyl ketone | 200 parts |

| <Coating solution for light diffusing layer> | |
|---|---|
| Acrylic polyol<br>(Acrydic A-807, solid content 50%:<br>Dainippon Ink and Chemicals Inc.) | 162 parts |
| Isocyanate<br>(Takenate D110N, solid content 60%:<br>Mitsui Takeda Chemicals) | 32 parts |
| Spherical acrylic resin particles<br>(Techpolymer MBX-8, mean particle diameter: 8 μm<br>Sekisui Plastics Co., Ltd.) | 160 parts |
| Butyl acetate | 200 parts |
| Methyl ethyl ketone | 200 parts |

Example 2

An anti-Newton ring sheet according to the present invention was produced in the same manner as in Example 1 except that the 1.5 parts of mono disperse spherical silica particles (mean particle diameter: 1.1 μm) in the coating solution for an anti-Newton ring layer of Example 1 was replaced with 0.5 parts of monodisperse true-spherical silicone resin particles (mean particle diameter: 0.5 μm), and thereafter a light diffusing sheet was produced using the anti-Newton ring sheet.

Example 3

An anti-Newton ring sheet according to the present invention was produced in the same manner as in Example 1 except that the 1.5 parts of monodisperse spherical silica particles (mean particle diameter: 1.1 μm) in the coating solution for an anti-Newton ring layer of Example 1 was replaced with 3.0 parts of monodisperse true-spherical silicone resin particles (mean particle diameter: 2.0 μm), and thereafter a light diffusing sheet was produced using the anti-Newton ring sheet.

Comparative Example 1

An anti-Newton ring sheet was produced in the same manner as in Example 1 except that the 1.5 parts of monodisperse spherical silica particles (mean particle diameter: 1.1 μm) in the coating solution for an anti-Newton ring layer of Example 1 was replaced with 1.5 parts of irregular aggregated silicone resin particles (mean particle diameter: 1.4 μm), and thereafter a light diffusing sheet was produced using the anti-Newton ring sheet.

Comparative Example 2

An anti-Newton ring sheet was produced in the same manner as in Example 1 except that the 1.5 parts of monodisperse spherical silica particles (mean particle diameter: 1.1 μm) in the coating solution for an anti-Newton ring layer of Example 1 was replaced with 0.5 parts of monodisperse spherical silica particles (mean particle diameter: 0.3 μm), and thereafter a light diffusing sheet was produced using the anti-Newton ring sheet.

Comparative Example 3

An anti-Newton ring sheet was produced in the same manner as in Example 1 except that the 1.5 parts of monodisperse spherical silica particles (mean particle diameter: 1.1 μm) in the coating solution for an anti-Newton ring layer of Example 1 was replaced with 3.0 parts of monodisperse true-spherical silicone resin particles (mean particle diameter: 3.0 μm), and thereafter a light diffusing sheet was produced using the anti-Newton ring sheet.

Comparative Example 4

An anti-Newton ring sheet was produced in the same manner as in Example 1 except that the 1.5 parts of monodisperse spherical silica particles (mean particle diameter: 1.1 μm) in the coating solution for an anti-Newton ring layer of Example 1 was replaced with 0.1 parts of monodisperse true-spherical silicone resin particles (mean particle diameter: 0.5 μm), and thereafter a light diffusing sheet was produced using the anti-Newton ring sheet.

Comparative Example 5

An anti-Newton ring sheet was produced in the same manner as in Example 1 except that the 1.5 parts of monodisperse spherical silica particles (mean particle diameter 1.1 μm) in the coating solution for an anti-Newton ring layer of Example 1 was replaced with 4.0 parts of monodisperse true-spherical silicone resin particles (mean particle diameter 2.0 μm), and thereafter a light diffusing sheet was produced using the anti-Newton ring sheet.

Each of the light diffusing sheets obtained in the Examples and Comparative examples was laminated on a wedge-shape light guide plate provided with a cold cathode lamp at its end so that the anti-Newton ring layer was brought into contact with the light guide plate to fabricate a simple backlight unit. The backlight unit was installed in a box, and "scratching action on the light guide plate surface" and "occurrence of Newton rings" were evaluated as set out below. The results of evaluation are shown in Table 1.

Scratching Action on the Light Guide Plate Surface

The box containing the backlight unit was shaken to conduct a vibration test. Thereafter, the backlight unit was taken apart and scratches produced on the light guide plate surface were visually observed. In the evaluation, "⊚" indicates that no scratch was visually observed. "○" indicates that was almost no scratches were visually observed and "X" indicates that scratches were visually observed.

Occurrence of Newton Rings

It was visually observed whether Newton rings were generated between the light diffusing sheet and the light guide plate when the lamp of the backlight unit was turned on. In the evaluation, "○" indicates that Newton rings were not generated and "X" indicates that Newton rings were generated.

TABLE 1

| | | Kind of particles | Mean particle diameter (μm) | Content (parts) | Scratching action | Anti-Newton ring Effect |
|---|---|---|---|---|---|---|
| Exam | 1 | Mono-disperse spherical | 1.1 | 1.5 | ⊚ | ○ |
| | 2 | " | 0.5 | 0.5 | ⊚ | ○ |
| | 3 | " | 2.0 | 3.0 | ○ | ○ |
| Comp exam | 1 | Irregular silica | 1.4 | 1.5 | X | ○ |
| | 2 | Mono-disperse spherical | 0.3 | 0.5 | ⊚ | X |
| | 3 | " | 3.0 | 3.0 | X | ○ |
| | 4 | " | 0.5 | 0.1 | ⊚ | X |
| | 5 | " | 2.0 | 4.0 | X | ○ |

As can be clearly seen from the results in Table 1, the light diffusing sheets of the Examples (in which the anti-Newton ring layers contained monodisperse spherical particles having a mean particle diameter of not less than 0.4 μm and not more than 2.0 μm, in an amount of not less than 0.5 parts by weight and not more than 3 parts by weight based on 100 parts by weight of the binder resin) did not scratch the light guide plate surface and showed an excellent anti-Newton ring effect. In particular, the light diffusing sheet obtained in Examples 1 and 2, whose anti-Newton ring layers contained particles having a mean particle diameter of 1.3 pm or less, did not scratch the light guide plate surface at all and were rated excellent for anti-scratch property.

On the other hand, the anti-Newton ring layer of the light diffusing sheet of Comparative example 1, whose anti-Newton ring layer contained irregular aggregated silica particles instead of monodisperse spherical particles, scratched the light guide plate surface.

In the light diffusing sheet of Comparative example 2, whose anti-Newton ring layer contained monodisperse spherical particles having a mean particle diameter of less than 0.4 μm, occurrence of Newton rings was not prevented by the anti-Newton ring layer.

The anti-Newton ring layer of the light diffusing sheet of Comparative Example 3, whose anti-Newton ring layer contained monodisperse spherical particles having a mean particle diameter of more than 2.0 μm, scratched the light guide plate surface.

In the light diffusing sheet of Comparative Example 4, in which the content of the particles constituting the anti-Newton ring layer was less than 0.5 parts by weight based on 100 parts by weight of the binder resin, occurrence of Newton rings was not prevented by the anti-Newton ring layer.

The anti-Newton ring layer of the light diffusing sheet of Comparative Example 5, in which the content of particles constituting the anti-Newton ring layer was more than 3.0 parts by weight based on 100 parts by weight of the binder resin, scratched the light guide plate surface.

The invention claimed is:

1. An anti-Newton ring sheet comprising an anti-Newton ring layer formed on at least one surface of a transparent polymer film, wherein the anti-Newton ring layer comprises at least one binder resin and particles that are monodisperse spherical particles having approximately the same size with a coefficient of variation of the particle diameter distribution of not more than 25%, the particles having a mean particle diameter of not less than 0.4 μm and not more than 2.0 μm and which are included in an amount of not less than 0.5 parts by weight and not more than 3 parts by weight based on 100 parts by weight of the binder resin, said anti-Newton ring layer having a thickness of 3-20 μm.

2. The anti-Newton ring sheet of claim 1 wherein said particles are included in an amount of more than 0.5 parts by weight based on 100 parts by weight of the binder resin.

3. The anti-Newton ring sheet of claim 1 wherein said binder resin consists of a thermoplastic resin or a thermosetting resin.

4. The anti-Newton ring sheet of claim 1 wherein said binder resin consists of a thermoplastic resin.

5. The anti-Newton ring sheet of claim 1 wherein said binder resin consists of a thermosetting resin.

6. The anti-Newton ring sheet of claim 1 wherein said coefficient of variation of the particle size distribution is not more than 20%.

7. The anti-Newton ring sheet of claim 1 wherein said coefficient of variation of the particle size distribution is not more than 15%.

8. The anti-Newton ring sheet of claim 1 wherein said coefficient of variation of the particle size distribution is not more than 10%.

9. The anti-Newton ring sheet of claim 1 wherein the monodisperse spherical particles have a mean diameter of not more than 1.3 μm.

10. An optical film comprising an anti-Newton ring layer formed on at least one surface of a transparent polymer film and an optical function layer having a predetermined optical property on another surface of the transparent polymer film, wherein the anti-Newton ring layer comprises at least one binder resin and particles that are monodisperse spherical particles having approximately the same size with a coefficient of variation of the particle diameter distribution of not more than 25%, the particles having a mean particle diameter of not less than 0.4 μm and not more than 2.0 μm and which are included in an amount of not less than 0.5 parts by weight and not more than 3 parts by weight based on 100 parts by weight of the binder resin, said anti-Newton ring layer having a thickness of 3-20 μm.

11. The optical film having an anti-Newton ring property of claim 2, wherein the optical function layer is a light diffusing layer.

12. The optical film of claim 10 additionally comprising a plate in contact with said anti-Newton ring layer, said plate formed of a material softer than said anti-Newton ring layer.

13. The optical film of claim 10 wherein the particles are included in an amount of more than 0.5 parts by weight based on 100 parts by weight of the binder resin.

14. The optical film of claim 10 wherein said binder resin consists of a thermoplastic resin or a thermosetting resin.

15. The optical film of claim 10 wherein said binder resin consists of a thermoplastic resin.

16. The optical film of claim 10 wherein said binder resin consists of a thermosetting resin.

17. The optical film of claim 10 wherein said coefficient of variation of the particle size distribution is not more than 20%.

18. The optical film of claim 10 wherein said coefficient of variation of the particle size distribution is not more than 15%.

19. The optical film of claim 10 wherein said coefficient of variation of the particle size distribution is not more than 10%.

20. The optical film of claim 10 wherein the monodisperse spherical particles have a mean diameter of not more than 1.3 μm.

* * * * *